Dec. 18, 1934.  M. M. PHILLIPS ET AL  1,984,892

THERMOSTATICALLY REGULATED MIXING VALVE

Filed Dec. 16, 1932   3 Sheets-Sheet 1

INVENTOR

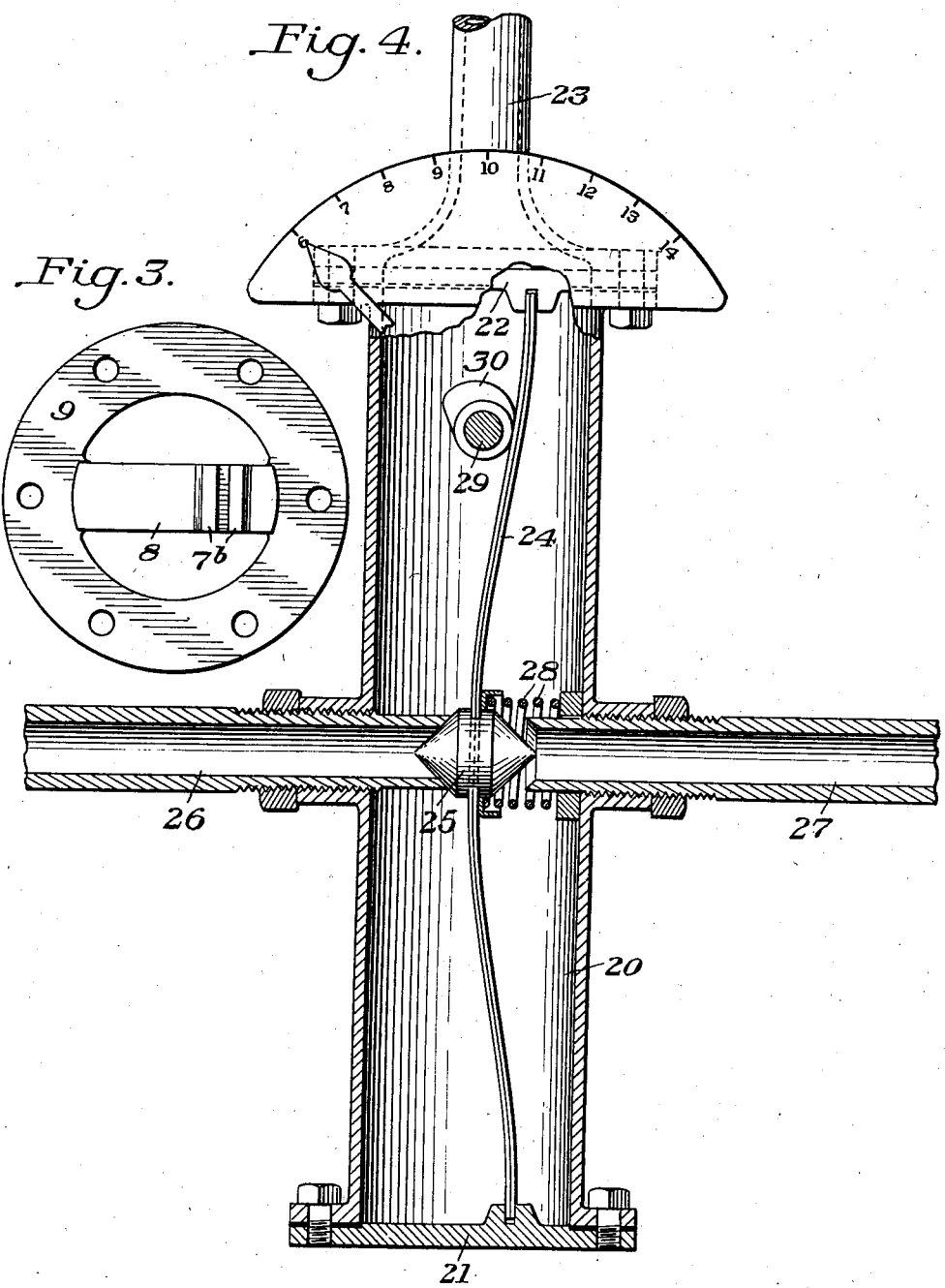

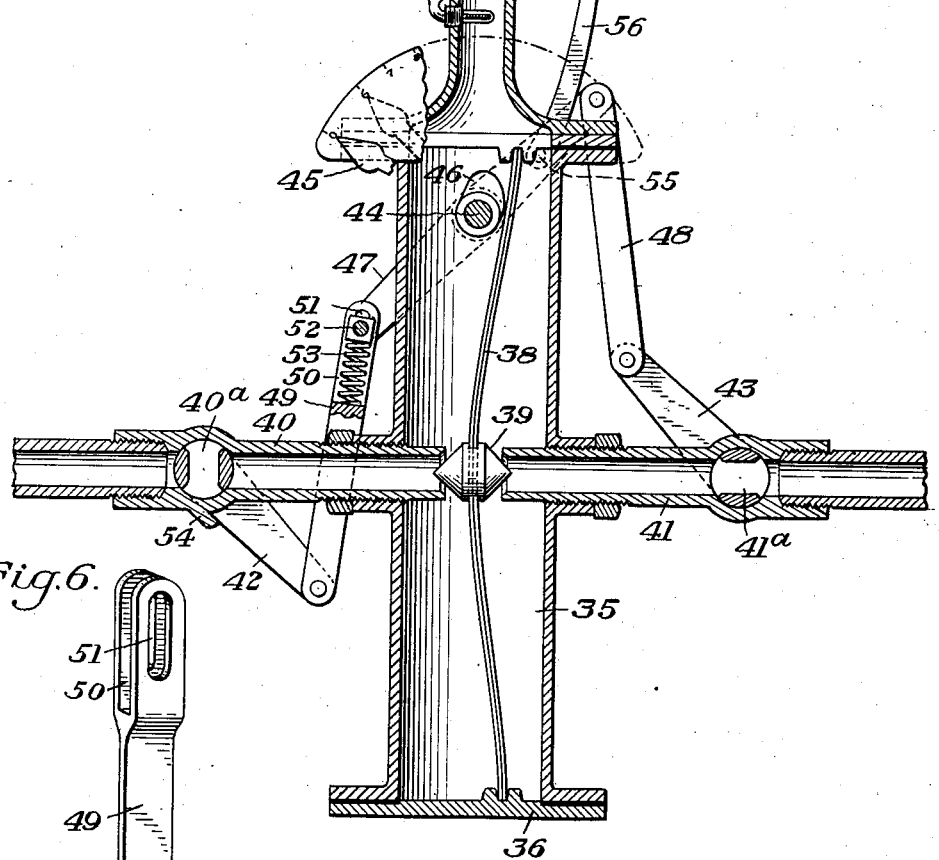

Patented Dec. 18, 1934

1,984,892

UNITED STATES PATENT OFFICE 1,984,892

THERMOSTATICALLY REGULATED MIXING VALVE

Maurice M. Phillips and Arthur P. Schaefer, Pittsburgh, Pa.

Application December 16, 1932, Serial No. 647,532

19 Claims. (Cl. 236—12)

This invention relates to mixing valves for use where fluids of different temperatures are mixed and where it is desirable to maintain the temperature of the mixture at a predetermined point. It also applies to that type of valve where either the hot fluid or the cold fluid may be discharged alone, or where the temperature of the mixture can be controlled over a wide range from 100% of the cold fluid to 100% of the hot fluid. Such valves find application in various industrial fields, and they are also desirable in controlling the temperature of water in shower baths.

Mixing valves generally comprise some type of mixing chamber or common discharge passage into which one pipe or connection delivers hot fluid and the other pipe or connection delivers cold fluid. Valve means of some type is provided whereby as the flow of one fluid is increased, the flow of other fluid is diminished. By adjustment of this valve means selectively varying proportions of the two fluids are introduced into the mixing chamber.

As long as the relative pressures of the two fluids remain constant, or as long as there is no variation in temperature of either fluid, the temperature of the mixture discharging from the mixing chamber will remain constant. Practically, however, relative changes of pressure occur, causing fluctuations in the temperature of the fluid discharged from the mixing chamber. If, for instance, the cold fluid pressure falls off while the hot fluid pressure remains normal, there will, at a particular valve setting, be a relative increase of hot fluid over cold fluid, with the result that the temperature of the fluid discharging from the mixing chamber will increase. If, on the other hand, the hot fluid pressure falls off, or the cold fluid pressure increases, the temperature of the mixture discharging from the mixing valve will drop.

Various arrangements have been proposed for compensating for these fluctuations by the use of some thermally responsive means which will compensate for such fluctuations in pressure or for fluctuations in the relative temperatures of the two fluids, but such devices as have heretofore been proposed have been expensive to manufacture and have been so constructed that after a period of operation corrosion or foreign matter interfering with the proper functioning of the valve develops.

According to the present invention there is provided a thermally compensated mixing valve which can be manufactured much more cheaply than devices heretofore proposed for this purpose, and which contains no parts which can be affected by the accumulation of foreign matter, and which is more direct and positive and less subject to corrosion than devices heretofore designed for this purpose.

The invention contemplates the provision of a valve means directly carried on a thermally responsive element within the mixing chamber and so arranged that an increase in temperature in the mixing chamber causes a restriction of the flow of hot fluid into the mixing chamber, and a decrease in the temperature in the mixing chamber allows a relatively increased flow of the hot fluid into this chamber.

The invention may be readily understood by reference to the accompanying drawings in which:

Figure 3 is a detail view of a spider at one end of the mixing chamber for supporting one end of a thermally responsive element;

Figure 4 is a view similar to Fig. 1 of a modified construction;

Figure 5 is a vertical section through a valve somewhat similar to that shown in Fig. 1 and showing a cut-off valve and volume control valve operatively connected with the mixing valve; and Figure 6 is a detail view of one of the operating connections used in the assembly shown in Fig. 5.

It will be understood that the accompanying drawings are illustrative of certain embodiments of my invention and that the invention is not limited to the particular constructions and arrangements of parts therein disclosed.

Figure 1:
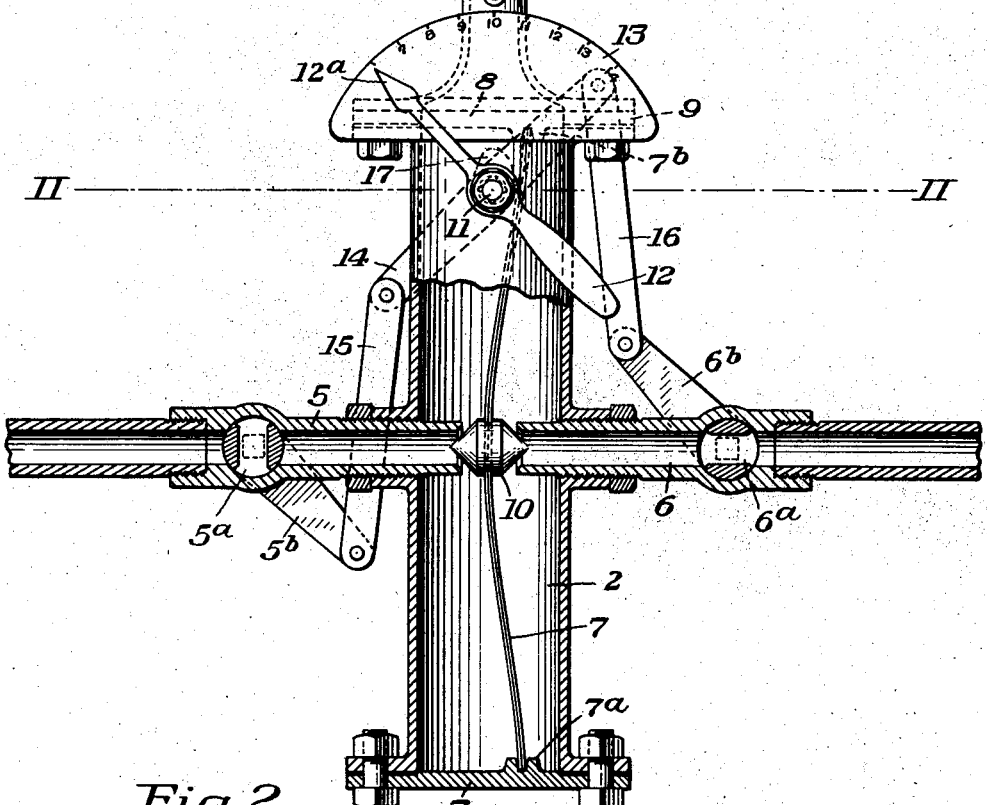
Figure 1 represents a view partly in side elevation and partly in section of a mixing valve embodying one form of my invention.
Figure 2:
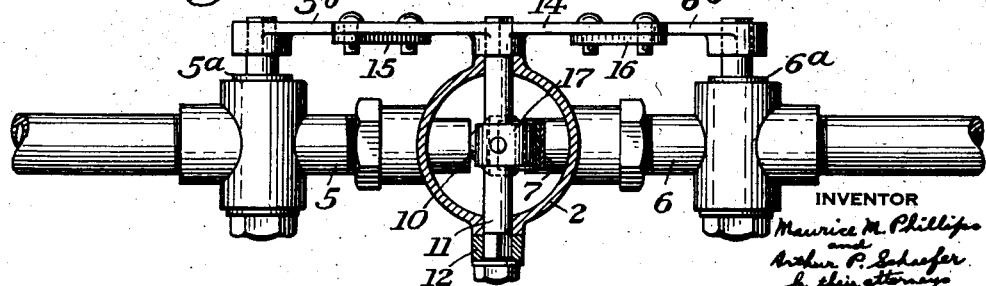
Figure 2 is a transverse horizontal section in the plane of line II—II of Fig. 1.

Referring first to the construction shown in Figs. 1 and 2, the numeral 2 designates an elongated mixing chamber the lower end of which is closed by a bottom plate 3 and at the top of which is a discharge connection 4. Opening into the mixing chamber is a hot water discharge pipe 5 and at a diametrically opposite point is a cold fluid discharge pipe 6. The pipes 5 and 6 open into the chamber 2 intermediate the ends of the chamber, and they are preferably threaded into the side walls of the chamber so that they can be adjusted toward or away from the vertical center line of the chamber for adjustment of the valve, as will hereafter more fully appear.

Within the chamber 2 is a thermally responsive bowed strip 7. One end of this strip is set between retaining lugs 7a on the bottom plate 3 and the other end of this strip is set between similar lugs 7b on the cross web 8 of a spider 9, shown in detail in Fig. 3, positioned at the top of the mixing chamber, this spider serving to support the thermally responsive strip 7, and at the same time permit the flow of fluid from the mixing chamber into the discharge pipe 4. The thermally responsive strip 7 is preferably in the nature of a bimetallic strip, the convex side of the strip being formed of a metal having a relatively high thermal coefficient of expansion, and the concave side of the strip being formed of metal having a relatively low thermal coefficient of expansion. Carried on this strip, so as to be opposite one, and preferably both, of the discharge pipes 5 and 6, is a valve plug 10. This plug has one face, and preferably both faces, arranged to cooperate and seat in one or the other of the pipes 5 and 6.

In the pipe 5 is a volume control valve 5a of any suitable type, it being illustrated as being a valve of the rotary plug type. In the pipe 6 is a similar valve 6a. Each of the valves 5a and 6a are provided with operating extensions 5b and 6b, respectively.

Passing diametrically through the mixing chamber is a shaft 11. On one end of this shaft at the front of the mixing valve is an operating handle 12 by means of which the shaft may be rotated, this handle 12 having an indicator extension 12a projecting over a graduated segment 13, this segment being secured to the outside of the valve. On the opposite end of the shaft 11 from the operating handle 12 is a cross lever 14, this cross lever being at the back of the valve as viewed in Fig. 1. One end of the cross lever 14 is connected through a link 15 with the valve operating lever 5b, and the other end of the lever 14 is similarly connected through link 16 with the valve operating lever 6b. The valves 5a and 6a are oppositely positioned, as shown, so that when one valve is fully closed the other one is fully open. The mechanism comprising the operating handle 12, the shaft 11, and the cross lever 14 and the attached links provides a means for operating the valves 5a and 6a simultaneously and in opposite directions. As the lever 12 is moved in a clockwise direction the valve 5a will be opened and the valve 6a will be closed, and movement of the operating handle in the reverse direction will, of course, have the reverse effect.

Carried on the shaft 11 and located inside the mixing chamber is a cam 17. This cam is rotated with the shaft 11, and it is positioned to bear against the thermally responsive strip 7. In the position shown in Figure 1, the cam does not exert any pressure on this strip. However, as the handle is moved in a clockwise direction from the position shown in Fig. 1, the cam will exert an increasing pressure against the strip 7, tending to urge the strip, with its attached valve plug 10, in a direction away from the hot water to the hot fluid inlet pipe. This cam provides the selective compensating mechanism, by reason of which as higher temperatures are desired in the mixing chamber the valve member 10 is moved away from the hot fluid discharge pipe, whereby a correspondingly greater amount of expansion must take place in the bimetallic element 7 to offer the same degree of obstruction to the discharge of hot fluid that it does when the cam is not deflecting the strip at all.

At a given setting of the operating handle 12, other than the setting shown in Fig. 1, each valve will permit a definite amount of fluid to enter the mixing chamber. As long as the temperatures and the pressure of the fluid supply pipes stay the same, the valve plug 10 will offer no restriction to the discharge of fluid into the mixing chamber. However, if for some reason, the hot fluid pressure should become relatively greater or the cold fluid pressure relatively less, or there should be a change in the temperature which would tend to increase the temperature in the mixing chamber, the bimetallic strip 7 would, by reason of the increase in temperature, tend to bow to an increased extent, causing the plug 10 to restrict the discharge from the pipe 5. The compensating means, such as the cam 17, is so arranged that at any definite setting the deflection of the strip 7 will only cause movement of the plug when the temperature in the mixing chamber exceeds that for which the mixing valve is set. It will of course be appreciated that if the fluid temperature in the mixing chamber falls below that for which the valve is set, the plug will move toward the cold fluid discharge and away from the hot fluid discharge. By reason of the fact that the pipes 5 and 6 are screwed into the casing of the mixing chamber, they can be very accurately adjusted with respect to the valve 10 and properly positioned for the calibration of the segment 13.

It will be observed that with the construction shown in Fig. 1 the cold water discharge pipe is fully open when the hot water discharge pipe is fully closed. In order that discharge from the valve may be entirely shut off, or the volume of the discharge regulated at any setting of the mixing valve, there is provided an ordinary hand valve or cock 18 in the discharge pipe from the mixing chamber. When it is desired to discharge only cold fluid from the mixing chamber the parts are in the position shown in Fig. 1 and the valve 18 is open, and the extent to which the valve is open determines the volume of fluid discharged. If the valve 18 is fully closed, no fluid can discharge from the mixing chamber. The valve 18 can, of course, be set to regulate the volume of discharge at any setting of the handle 12.

In the arrangement shown in Figure 4 I have illustrated a modification of the arrangement shown in Figs. 1 and 2 in which the valves 5a and 6a are entirely eliminated, and the only means for cutting off the discharge of fluid from one of the pipes is the plug on the thermally responsive strip.

In this figure, 20 designates the mixing chamber having a bottom plate 21 and a top plate 22 similar to the spider shown in Figure 3, and leading from the top of the chamber is the discharge pipe 23. Extending lengthwise of the mixing chamber is a thermally responsive strip 24 corresponding to the element 7 previously described, and which carries a valve plug 25 midway between its ends. Entering the mixing chamber at diametrically opposite points are fluid discharge pipes 26 and 27. Both of these pipes are adjustably screwed into the mixing chamber so that their position relatively to the plug 25 can be adjusted. The plug 25 is adapted to operate between the ends of the two tubes 26 and 27. For the purpose of illustration it may be assumed that 26 introduces the hot fluid and 27 the cold fluid. At 28 is a compression spring which bears against the strip 24 adjacent the valve plug for urging the valve plug 25 into setting relation with the end of the pipe 26.

Passing through the upper part of the mixing chamber is an operating shaft 29 similar to the shaft 11 previously described and which is provided with an operating handle similar to that shown in Fig. 1. This shaft carries a cam 30 adapted to bear against the strip 24 and urge it in a direction opposite the direction in which the strip is urged by the spring 28.

Assuming, as stated above, that the pipe 26 introduces the hot fluid and 27 introduces the cold fluid, the valve will, with the parts in the position shown in Fig. 4, permit only the cold fluid to enter the mixing chamber. By rotating the shaft 29 the cam 30 will force the valve plug 25 away from the end of the pipe 26 and toward the end of the pipe 27, tending to permit the discharge of the hot fluid and correspondingly restrict the discharge of cold fluid, and the relative opening and closing of the two pipes will be determined by the relative position of the cam 30 at any given setting.

If, for example, the cam 30 is set to a position where both pipes are open to the same extent, a certain temperature will prevail in the mixing chamber, as long as the relative pressures in the pipes 26 and 27 remain the same and the relative temperatures remain the same. If, however, there is a fluctuation in one with respect to the other, the thermally responsive strip 24 will be flexed in one direction or the other, depending on whether the mixing chamber temperature increases or decreases, and a corresponding compensation in the flow from the two pipes will be effected.

Instead of eliminating the two control valves 5a and 6a, as disclosed in the modification in Fig. 4, it may be desirable to co-relate the operation of these valves with that of the volume control valve. Such a co-relation of the valves is disclosed in Fig. 5. In this figure an arrangement is provided whereby when the mixing lever handle is thrown to the extreme limit of movement in one direction, the valve in the discharge pipe from the mixing chamber will be operated to a fully closed position. This is desirable, for instance, in a shower bath valve where the user generally wants to operate only one handle to turn the water on and adjust it to the proper degree of temperature, and have another means which will regulate the force of the spray.

In the arrangement shown in Figure 5, 35 designates the mixing chamber with the parts arranged as disclosed in Fig. 1, the mixing chamber having a bottom plate 36, an outlet pipe 37, and having a thermally responsive strip 38 therein extending lengthwise thereof, this strip carrying a valve plug 39. Entering the chamber on opposite sides of the valve plug 39 are pipes 40 and 41, these pipes having valves 40a and 41a, respectively, corresponding to the valves 5a and 6a of Fig. 1. The valve 40a has an operating lever 42, and valve 41a has an operating lever 43. Passing through the upper part of the mixing chamber is a shaft 44 which carries a combined handle and indicator 45 similar to the handle and indicator 12 of Fig. 1. This shaft is also provided with a cam 46 which is inside the mixing chamber and which is adapted to bear against the strip 38 for the purpose previously described. The shaft 44 also carries a cross lever 47 at the back of the mixing chamber, one end of which is connected through link 48 with the operating lever 43 of valve 41a. The other end of the lever 47 is connected through a compression link unit 49 with the operating lever 42 of valve 40a. This compression link unit comprises the link member 49, having a bifurcated upper end portion 50 which is slotted at 51. The lever 47 has a cross pin 52 which passes through the slots 51 in the bifurcated end of the link, and there is a compression spring 53 between the bifurcated parts of the link bearing against the cross pin. The valve 40a has a stop lug 54 thereon for preventing overtravel of the operating lever 42 so that the valve cannot be operated past the position shown in Fig. 5.

Pivotally connected to the cross lever 47 at 55 is an operating link 56 the upper end of which is pivotally connected at 57 with the operating lever 58 of a rotatable hollow valve plug 59, which plug is in a valve casing 60 carried on the discharge pipe 37. This hollow valve plug has a slotted port 61 therein through which fluid may flow from the discharge pipe 37 into the hollow chamber in the plug 59. The escape of fluid from the plug into an outlet pipe 62 is controlled by a plug valve 63 inside the hollow plug 59, the valve 63 having an operating stem 64 which projects through a gland 65 at the outer end of the valve plug 59, the stem 64 having a threaded portion 66 which engages internal threads on the inside of the stem portion 67 of the hollow plug 59.

With the pointer set as shown in Fig. 5, to the zero point, the spring 53 is compressed with the valve 40a fully closed, and only cold water is in the mixing chamber, and this cold water cannot escape because the port 60 in the plug 59 is turned away from the end of the discharge pipe 37. If now the pointer 45 is turned to the position marked 6 on the indicator scale, valve 40a will not operate, the motion of the lever 47 being entirely taken up by the spring 53 and the slots 51, this connection providing a lost motion connection. This movement of the lever 47, however, will cause a downward pull on the link 56, tending to rotate the plug 59 to a position where the slot 60 opens into the outlet pipe 37. In this position cold fluid is still the only fluid admitted to the mixing chamber, but this cold fluid can now escape into the chamber in the plug 59, and if the hand wheel for the valve 63 is operated the desired volume of cold fluid can be discharged into the pipe 62. For instance, in a shower bath, where the fluid would be water, this setting of the valve permits the operator to take a cold shower and to regulate the force of the spray, while the turning on of the shower is determined primarily by the movement of the pointer 45 from the zero position to the dotted line position. If a mixture of hot and cold fluids is desired, the indicator 5 is moved to the desired position, rotating the shaft 44 to operate the cam 46 and also operate the valves 40a and 41a. After the lost motion has been taken up in the compression link unit 49, the continued travel of the lever 47 operates the valve 40a.

The port 61 in the valve plug 59 extends sufficiently around the periphery of the valve plug to permit of a 90° rotation of the plug 59 so that the valve will be open even when the pointer 45 is moved to the extreme limit of its travel in a clockwise direction, at which time the valve 41a would be fully closed and the valve 40a fully open, in which position only the hot fluid would be discharged.

This coupling together of the two valves enables the operating lever for the mixing valve to be set to an off position in which no fluid will be discharged due to the fact that the valve plug 59 is in a closed position, or to be moved to a position where only cold fluid will be discharged, or to be moved to a position where only hot fluid is discharged, or to any position intermediate cold and hot. The valve 65 within the valve plug 59 provides a convenient manual adjustment for the volume of fluid discharge.

The compression link unit 49 is provided so so that the valve 59 can be open when it is desired to discharge only cold fluid, i. e., when the pointer 45 is at the dotted line position, but it permits the necessary overtravel of the lever 47 when the pointer is moved from the dotted line position to the full line position at zero for moving the valve plug 59 to its closed position.

It will be understood that the various embodiments of our invention which have been described are merely illustrative of the invention and that various changes and modifications may be made therein, and various devices used in place of the cam for flexing the thermally responsive element or strip to the necessary extent for a given mixing chamber temperature, and that I have purposely illustrated simple forms of lever arrangements and valve arrangements for the purpose of illustration and that various types of valves and operating couplings can be substituted.

The advantages of the invention reside in the provision of a thermally responsive element directly within the mixing chamber for operating to compensate for fluctuations in temperature without resorting to the use of closely fitting parts or delicately operating valves capable of becoming clogged or eroded. The invention at the same time provides a thermally compensated mixing valve which can be quite cheaply manufactured, in which the interference in the operation of the valve from corrosive influences can be greatly minimized and which can be conveniently used in connection with manually adjusted valves such as the valves 5a and 6a or 40a and 41a, or used without such valves, as disclosed in Fig. 4.

We claim:

1. A thermally compensated mixing valve, comprising a mixing chamber having at least two fluid inlet ports and a common discharge opening, and a thermally responsive strip extending lengthwise of the chamber and supported therein at its ends, said strip having a valve element positioned on the strip to move toward or away from one of said fluid inlet ports upon expansion or contraction of the strip.

2. A thermally compensated mixing valve, comprising a mixing chamber having at least two fluid inlet ports and a common discharge opening, a thermally responsive strip extending lengthwise of the chamber and supported therein at its ends, said strip having a valve element positioned on the strip to move toward or away from one of said fluid inlet ports upon expansion or contraction of the strip, and manually operable means for adjusting the strip.

3. A thermally compensated mixing valve, comprising a mixing chamber having at least two fluid inlet ports and a common discharge opening, a thermally responsive strip extending lengthwise of the chamber and supported therein at its ends, said strip having a valve element positioned on the strip to move toward or away from one of said fluid inlet ports upon expansion or contraction of the strip, and manually operable means for selectively moving the strip with its valve member relatively to the inlet port with which the valve member cooperates.

4. A thermally compensated mixing valve, comprising a mixing chamber having at least two fluid inlet ports and a common discharge opening, a thermally responsive strip extending lengthwise of the chamber and supported therein at its ends, said strip having a valve element positioned on the strip to move toward or away from one of said fluid inlet ports upon expansion or contraction of the strip, and manually adjustable means for selectively flexing the thermally responsive strip in a direction opposed to the direction in which the valve element moves upon expansion of the strip.

5. A thermally compensated mixing valve, comprising a mixing chamber having at least two fluid inlet ports and a common discharge opening, a thermally responsive strip extending lengthwise of the chamber and supported therein at its ends, said strip having a valve element positioned on the strip to move toward or away from one of said fluid inlet ports upon expansion or contraction of the strip, manually adjustable means for selectively flexing the thermally responsive strip in a direction opposed to the direction in which the valve element moves upon expansion of the strip, and a spring arranged in opposition to said flexing means.

6. A mixing valve comprising an elongated mixing chamber having diametrically opposed fluid inlet pipes the ends of which project into the mixing chamber, a thermally responsive strip extending lengthwise of the chamber and supported in the chamber at its opposite ends, and a valve member carried on said strip and located between the ends of said pipes which project into the mixing chamber and being adapted to cooperate with one of them for controlling the discharge of fluid therefrom.

7. A mixing valve comprising an elongated mixing chamber having diametrically opposed fluid inlet pipes the ends of which project into the mixing chamber, a thermally responsive strip extending lengthwise of the chamber and supported in the chamber at its opposite ends, and a valve member carried on said strip and located between the ends of said pipes which project into the mixing chamber and being adapted to cooperate with one of them for controlling the discharge of fluid therefrom, at least one of said pipes being adjustable with respect to said valve element.

8. A mixing valve comprising an elongated mixing chamber having diametrically opposed fluid inlet pipes the ends of which project into the mixing chamber, a thermally responsive strip extending lengthwise of the chamber and supported in the chamber at its opposite ends, and a valve member carried on said strip and located between the ends of said pipes which project into the mixing chamber and being adapted to cooperate with one of them for controlling the discharge of fluid therefrom, and manually adjustable means for adjusting the strip and valve element carried thereon relatively to the pipe with which the valve element cooperates.

9. A mixing valve comprising a mixing chamber having a hot fluid inlet port and a cold fluid inlet port, a thermally responsive element in the chamber, a valve element carried on said thermally responsive element and positioned for cooperation with one of said fluid inlet ports, said thermally responsive element being anchored at its ends and being bowed toward that fluid inlet port with which the valve element cooperates.

10. A thermally compensated mixing valve, comprising a mixing chamber having a hot fluid inlet passage, a cold fluid inlet passage, and a discharge passage, an adjustable valve in the hot fluid passage, an adjustable valve in the cold fluid passage, a common operating mechanism connected with both valves and arranged to open one valve as it closes the other, a thermally responsive member in the mixing chamber having a valve element thereon for cooperation with one of said fluid discharge passages, and means associated with said operating means for adjusting the thermally responsive element simultaneously with the operation of said valves.

11. A thermally compensated mixing valve, comprising a mixing chamber having a hot fluid inlet passage, a cold fluid inlet passage, and a discharge passage, an adjustable valve in the hot fluid passage, an adjustable valve in the cold fluid passage, a common operating mechanism connected with both valves and arranged to open one valve as it closes the other, a thermally responsive member in the mixing chamber having a valve element thereon for cooperation with one of said fluid discharge passages, means associated with said operating means for adjusting the thermally responsive element simultaneously with the operation of said valves, and a cut-off valve in the discharge passage selectively connected with said operating means.

12. A thermally compensated mixing valve, comprising a mixing chamber having a hot fluid inlet pipe and a cold fluid inlet pipe and having a discharge pipe leading therefrom, a thermally responsive element in the mixing chamber which is bowed toward one of said fluid inlet pipes and which is rigidly supported at its ends, said thermally responsive element having a valve element thereon adapted to cooperate with the fluid inlet pipe toward which the element is bowed, whereby a change in temperature in the mixing chamber tends to move said valve element relatively to the fluid inlet pipe with which it cooperates, and selectively operable means for simultaneously adjusting the volume flow from each of said inlet pipes to the mixing chamber and adjusting the thermally responsive element.

13. A thermally compensated mixing valve, comprising a mixing chamber having a hot fluid inlet pipe and a cold fluid inlet pipe and having a discharge pipe leading therefrom, a thermally responsive element in the mixing chamber which is bowed toward one of said fluid inlet pipes and which is rigidly supported at its ends, said thermally responsive element having a valve element thereon adapted to cooperate with the fluid inlet pipe toward which the element is bowed, whereby a change in temperature in the mixing chamber tends to move said valve element relatively to the fluid inlet pipe with which it cooperates, and manually adjustable means for applying flexing pressure to the thermally responsive element in a direction opposed to that in which the element is bowed.

14. A thermally compensated mixing valve, comprising a mixing chamber having a hot fluid inlet pipe and a cold fluid inlet pipe and having a discharge pipe leading therefrom, a thermally responsive element in the mixing chamber which is bowed toward one of said fluid inlet pipes and which is rigidly supported at its ends, said thermally responsive element having a valve element thereon adapted to cooperate with the fluid inlet pipe toward which the element is bowed, whereby a change in temperature in the mixing chamber tends to move said valve element relatively to the fluid inlet pipe with which it cooperates, and manually adjustable means for applying flexing pressure to the thermally responsive element in a direction opposed to that in which the element is bowed, said means comprising a cam.

15. A mixing valve comprising a mixing chamber having a hot fluid supply pipe and a cold fluid supply pipe and a discharge pipe, a thermally responsive valve arrangement within the mixing chamber for controlling the discharge of fluid from one of said supply pipes into the mixing chamber, a valve in each of said supply pipes adjustable from a fully open to a fully closed position, a common operating means connecting the two valves in the two supply pipes and arranged to impart a closing movement to one when it is opening the other, and means on said operating means for adjusting the thermally controlled valve simultaneously with the operation of said valves in the fluid supply pipe.

16. A mixing valve comprising a mixing chamber having a hot fluid supply pipe and a cold fluid supply pipe and a discharge pipe, a thermally responsive valve arrangement within the mixing chamber for controlling the discharge of fluid from one of said supply pipes into the mixing chamber, a valve in each of said supply pipes adjustable from a fully open to a fully closed position, a common operating means connecting the two valves in the two supply pipes and arranged to impart a closing movement to one when it is opening the other, and means on said operating means for adjusting the thermally controlled valve simultaneously with the operation of said valves in the fluid supply pipe, said operating means including a lost motion connection between the operating means and one of the valves in one of said supply pipes, and an operating connection between said operating means and the cut-off valve.

17. A mixing valve comprising a mixing chamber having a hot fluid supply pipe and a cold fluid supply pipe and a discharge pipe, a thermally responsive valve arrangement within the mixing chamber for controlling the discharge of fluid from one of said supply pipes into the mixing chamber, a valve in each of said supply pipes adjustable from a fully open to a fully closed position, a common operating means connecting the two valves in the two supply pipes and arranged to impart a closing movement to one when it is opening the other, and means on said operating means for adjusting the thermally controlled valve simultaneously with the operation of said valves in the fluid supply pipe, said operating means including a lost motion connection between the operating means and one of the valves in one of said supply pipes, an operating connection between said operating means and the cut-off valve, and a volume control valve formed integrally with the cut-off valve.

18. A thermostatically controlled valve comprising a casing having a plurality of ports therein, a thermally responsive strip extending across the ports and having its opposite ends supported within the casing, and a valve member carried on said strip, said valve member being adapted to cooperate with each of said ports for controlling the effective opening of the ports, said strip being adapted to bow toward and away from said ports with variations in the temperature.

19. A thermostatically controlled valve comprising a casing having a plurality of ports therein, a thermally responsive strip extending across the ports and having its opposite ends supported within the casing, and a valve member carried on said strip, said valve member being adapted to cooperate with each of said ports for controlling the simultaneously effective opening of the ports, said strip being adapted to bow toward and away from said ports with variations in the temperature.

MAURICE M. PHILLIPS.
ARTHUR P. SCHAEFER.